United States Patent
Mayr et al.

(10) Patent No.: US 7,516,756 B2
(45) Date of Patent: Apr. 14, 2009

(54) PROPORTIONAL PRESSURE CONTROL VALVE

(75) Inventors: Karlheinz Mayr, Bregenz (AT); Thilo Schmidt, Meckenbeuren (DE); Walter Kill, Friedrichshafen (DE); Markus Moosmann, Ravensburg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 570 days.

(21) Appl. No.: 10/571,971

(22) PCT Filed: Aug. 19, 2004

(86) PCT No.: PCT/EP2004/009289

§ 371 (c)(1),
(2), (4) Date: Mar. 15, 2006

(87) PCT Pub. No.: WO2005/026858

PCT Pub. Date: Mar. 24, 2005

(65) Prior Publication Data

US 2007/0023091 A1 Feb. 1, 2007

(30) Foreign Application Priority Data

Sep. 17, 2003 (DE) ................................ 103 42 892

(51) Int. Cl.
*F15B 13/044* (2006.01)
(52) U.S. Cl. .............................. 137/596.17; 251/129.14
(58) Field of Classification Search ............ 137/596.17, 137/625.26, 625.65; 251/129.14
See application file for complete search history.

(56) References Cited

U.S. PATENT DOCUMENTS

| | | | |
|---|---|---|---|
| 6,152,422 A | 11/2000 | Staib et al. | |
| 6,206,038 B1 * | 3/2001 | Klein et al. ............ | 137/596.17 |
| 6,273,122 B1 * | 8/2001 | Schudt et al. .......... | 137/596.17 |
| 6,328,065 B1 * | 12/2001 | Schmid et al. ......... | 137/596.17 |
| 6,378,545 B1 | 4/2002 | Bozkan et al. | |
| 6,418,967 B1 | 7/2002 | Frei et al. | |
| 6,619,615 B1 | 9/2003 | Mayr et al. | |
| 6,619,616 B1 * | 9/2003 | Sudani et al. .......... | 251/129.14 |
| 6,719,006 B2 | 4/2004 | Fleischer et al. | |
| 6,880,570 B2 * | 4/2005 | Moreno et al. ......... | 137/596.17 |
| 6,904,934 B2 | 6/2005 | Runge et al. | |
| 2004/0045611 A1 * | 3/2004 | Avila ..................... | 137/596.17 |

(Continued)

FOREIGN PATENT DOCUMENTS

DE 198 27 281 C1 1/2000

(Continued)

*Primary Examiner*—John Rivell
(74) *Attorney, Agent, or Firm*—Davis & Bujold, P.L.L.C.

(57) ABSTRACT

Proportional pressure control valve with a magnetic part and a valve part, the valve part has an inflow opening for the inflow stream, a first outflow opening for the filling stream, and a second outflow opening for the tank volume stream, and has a ball seat, a flat seat with an opening, a closing part for controlling the throughput quantity through the opening of the flat seat, and a stream diverter. The inflow opening faces away from the magnetic part and coaxially to its longitudinal axis, and the outflow openings are constructed on the side wall of the valve part radially to its longitudinal axis, so that fluid flowing from through the valve is exposed to a diversion of a maximum of 90°. The fluid, after flowing through the ball seat and to and through the stream diverter, experiences a diversion of less than 30°.

7 Claims, 2 Drawing Sheets

U.S. PATENT DOCUMENTS

| | | | |
|---|---|---|---|
| 2005/0061374 A1* | 3/2005 | Hameister et al. ...... | 137/596.17 |
| 2006/0272714 A1* | 12/2006 | Carrillo et al. ......... | 137/596.17 |
| 2007/0138422 A1* | 6/2007 | Najmolhoda et al. ... | 251/129.14 |

FOREIGN PATENT DOCUMENTS

| | | |
|---|---|---|
| DE | 199 43 066 A1 | 3/2000 |
| DE | 199 04 901 A1 | 8/2000 |
| DE | 100 24 700 A1 | 11/2001 |
| DE | 100 34 959 A1 | 2/2002 |
| WO | WO-98/48332 | 10/1998 |

\* cited by examiner

PROPORTIONAL PRESSURE CONTROL VALVE

This application is a national stage completion of PCT/EP2004/009289 filed Aug. 19, 2004 which claims priority from German Application Serial No. 103 42 892.5 filed Sep. 17, 2003.

FIELD OF THE INVENTION

The present invention relates to a proportional pressure control valve for regulating the pressure level in a hydraulic circuit.

BACKGROUND OF THE INVENTION

According to the state of technology, the pressure in a transmission, especially in an automatic transmission for motor vehicles, is regulated in a hydraulic circuit based on demand. While the pressure level in the hydraulic circuit can be kept low for the lubricating oil supply of the transmission parts. The pressure must be greatly increased during the shifting process in order, for example, to be able to quickly fill the shift elements.

Normally for the regulation of pressure in hydraulic circuits, pressure regulators are used, which control slides for clutch activation. The control of the slides occurs within the pressure regulator by way of a proportional magnet, which consists of a magnetic core, a magnetic coil and an armature. In the process, the coil current is power-controlled via the proportional magnet in proportion to the output value; the armature and thus the slide for clutch control are controlled according to the coil current. The characteristic curve desired for clutch adaptation is produced from the resulting characteristic magnetic force-current curves of the pressure regulator in the electro-hydraulic control system of the automatic transmissions.

DE 199 43 066 describes an electromagnetically activated, hydraulic proportional valve with a magnet part consisting of an electrically controlled coil, a fixed core extending into the interior of the coil and a movable armature acted on by the coil, which armature is coupled with a closing member and with a valve part comprising at least an intake channel, a return channel and an operating channel, as well as a valve seat through which an effective connection with the closing member controls a fluid connection between the operating channel and the return channel. At least in the area of its end facing the valve seat, the closing member comprises a basic cone-shaped, sealing body whose smaller front face is turned toward the valve seat, whereby the sealing body comprises at least one stall edge on its end facing away from the valve seat.

This configuration should permit the hydraulic proportional valve to behave in a stable manner with respect to temperature influences and oscillation excitation caused by the flow. The pressure/current characteristic curves of the proportional valve have a more constant and more stable course compared to customary pressure control valves, since the sealing properties and the wear behavior of this proportional valve are improved.

Another proportional, pressure control valve is described in DE 199 04 901 of the Applicant, whereby this proportional, pressure control valve is constructed as a relay valve with a pressure reduction and a pressure maintenance function. The valve consists of a valve housing with inflow and outflow openings, a control element, an armature rod and a proportional magnet, which consists of a magnetic core, and armature and a magnetic coil. The proportional magnet manifests an almost constant magnetic force in its operating range. In the stop position of the armature, the smallest axial separation between the armature and the magnetic core is dimensioned such that the magnetic force between these two parts in the stop position is greater than the magnetic force in the operating range of the proportional magnet, where the armature can be fixed in the stop position by means of this magnetic force.

Finally, a proportional, pressure control valve is known from DE 100 34 959 of the Applicant, including a valve part, inflow and outflow openings and at least one closing part to control an aperture and one of the openings, as well as a magnet part with a magnetic core, a magnetic coil and a displaceable armature. Working together with the armature is the activation element, which activates the closing part, especially at the aperture of the inflow opening, where the activation element penetrates at least partially into the aperture during the control process. The effective hydraulic cross-section of the aperture is thereby basically determined by the aperture length, the aperture diameter and the diameter of the activation element in the aperture.

With regard to an optimized flow rate in the valve part, especially in the range of lower temperatures, i.e., at higher viscosities of the hydraulic fluid and with regard to lower flow resistances, this proportional pressure control valve comprises an optimized supply geometry determining the flow rate, i.e., the relation of the aperture length to the aperture diameter is selected less than 2.0, where this aperture determining the flow rate is positioned, in particular, in the inflow opening of the valve. This way, this valve has lower flow losses, especially at high oil viscosities, i.e., at lower temperatures; higher throughput quantities and shorter response times are hence achieved for the valve, whereby this proportional pressure control valve facilitates better dynamic values.

In automatic transmissions on motor vehicles, a hydrodynamic converter is used as the starting element. The energy requirement for this component part is especially high with cold transmission oil, which affects the starting behavior of the vehicle. In addition, the response behavior of the transmission shift clutches is correspondingly delayed in the minus temperature range, which is also perceived to be unpleasant.

It is the goal of this invention to create a proportional, pressure control valve, with which an increase of the dynamic control capability of power shift clutches, especially the starting clutch in automatic transmissions, is achieved without a hydrodynamic starting element and the gearshifting clutches for motor vehicles.

SUMMARY OF THE INVENTION

The invention proceeds from a proportional pressure control valve, which comprises a magnetic part and a valve part, whereby the valve part is provided with an inflow opening for the inflow volume flow, a first outflow opening for the filling volume flow and a second outflow opening for the tank volume flow, and a ball seat, a flat seat provided with an opening, a closing part for controlling the throughput quantity through the opening in the flat seat and a stream diverter, which is placed between the ball seat and the flat seat.

The invention provides that the inflow opening for the inflow volume flow is constructed on the front side end of the valve part facing away from the magnet part and coaxially to its longitudinal axis; that the outflow opening for the filling volume flow for the clutch is constructed on the side wall of the valve part radially to its longitudinal axis, so that fluid particles flowing from the inflow opening to the outflow opening are exposed to a maximum diversion of 90°, and that the axial distance of the stream diverter from the ball seat, as well as the diameter, the wall thickness and the configuration of the stream diverter are selected such that the fluid particles, after flowing through the ball seat and to and through the stream diverter are exposed to a diversion of less than 30°.

The proportional, pressure control valve constructed, according to the invention, has the advantage of a lower flow resistance compared with customary pressure control valves and ensures an increase in the dynamic regulation capability of the power shifting clutches, which are starting clutches in automatic transmissions without hydrodynamic starting element or gearshifting clutches. It also has the advantage of shorter response times and results in an increase in the cut-off frequency of the system of clutch+start element, so that at minus temperatures a spontaneous frictional connection is possible.

BRIEF DESCRIPTION OF THE DRAWINGS

The invention will now be described, by way of example, with reference to the accompanying drawings in which.

DETAILED DESCRIPTION OF THE INVENTION

Such proportional, pressure control valves are well known in the art, so that in the following only those parts are described, which are needed for an understanding of the invention.

Figure 1:
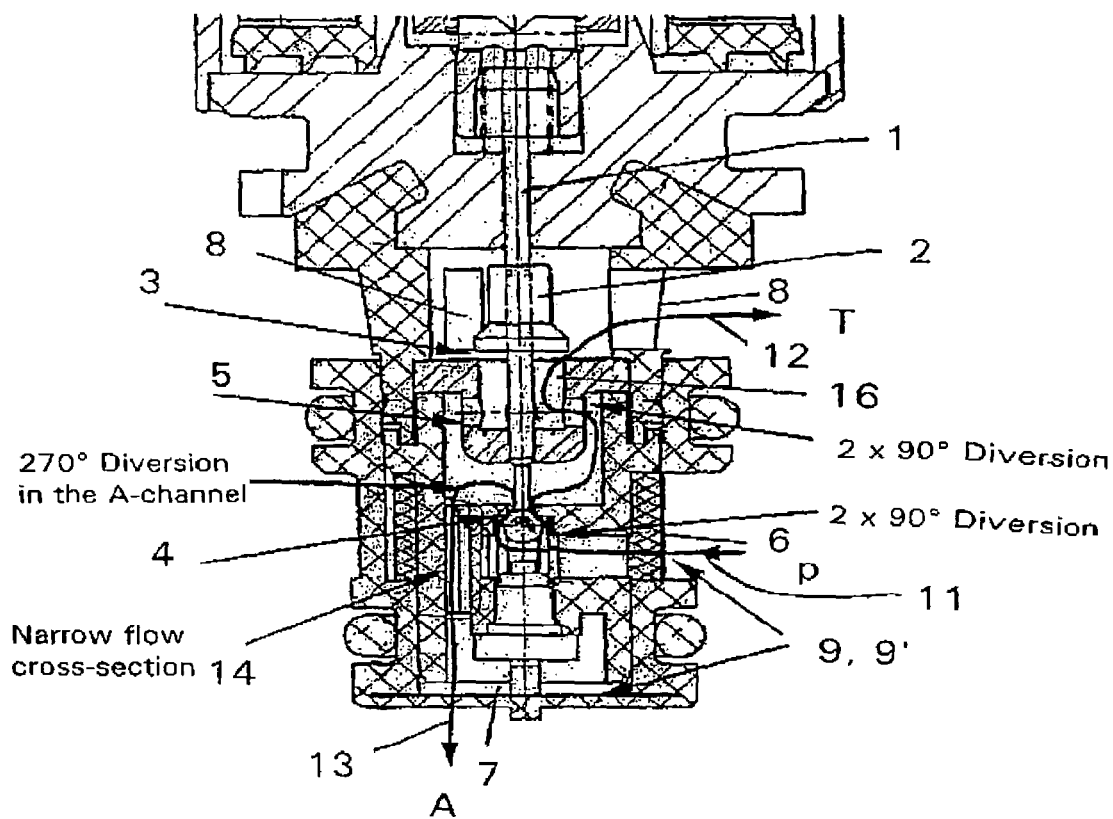
FIG. 1 is a cut through a valve part of a customary proportional, pressure control valve according to the state of the art.

The proportional, pressure control valve comprises a magnetic part shown without detail in the upper part of FIG. 1, which part comprises the customary magnetic core, a magnetic coil and a movable armature, as well as a movable activation part 1 of the armature for a closing part 2, which can come to a stop on a flat seat 3 and thereby closes a continuous opening 16 incorporated in the flat seat.

Number 4 designates a customary ball seat for a valve; 5 designates a stream diverter; 6 designates an inflow opening for an inflow volume stream with an inflow pressure p; 7 designates an outflow opening for the filling volume stream to the clutch with the operating pressure A; 8 designates an outflow opening for the tank volume stream with the ambient pressure T; 9 and 9' designate two, small meshed filter sieves, whereby filter sieve 9 is inserted at least in the outflow opening 7 and filter sieve 9' is inserted in the inflow opening 6.

In addition, some flow streams, consisting of fluid particles, are shown in FIG. 1 in order to illustrate the path of the fluid particles through the pressure control valve. A fluid particle entering the inflow opening 6 for the inflow volume stream follows a path designated as 11 and after leaving the ball seat 4 will follow either a path 12 through the outflow opening 8 in the direction of a tank or a path designated with 13 through the outflow opening 7 in the direction of the clutch.

In the process it encounters the following flow resistances:
filter sieve 9, which typically has a mesh size of 160 μm;
a 90° diversion;
the ball seat 4 (for path 11);
a 270° diversion;
a narrow flow cross-section designated as 14;
a filter sieve 9,' which also typically has a mesh size of 160 μm (for path 13);
a 90° diversion;
two 90° diversions in the stream diverter 5;
the flat seat 3;
the tank (for path 12).

Figure 2:
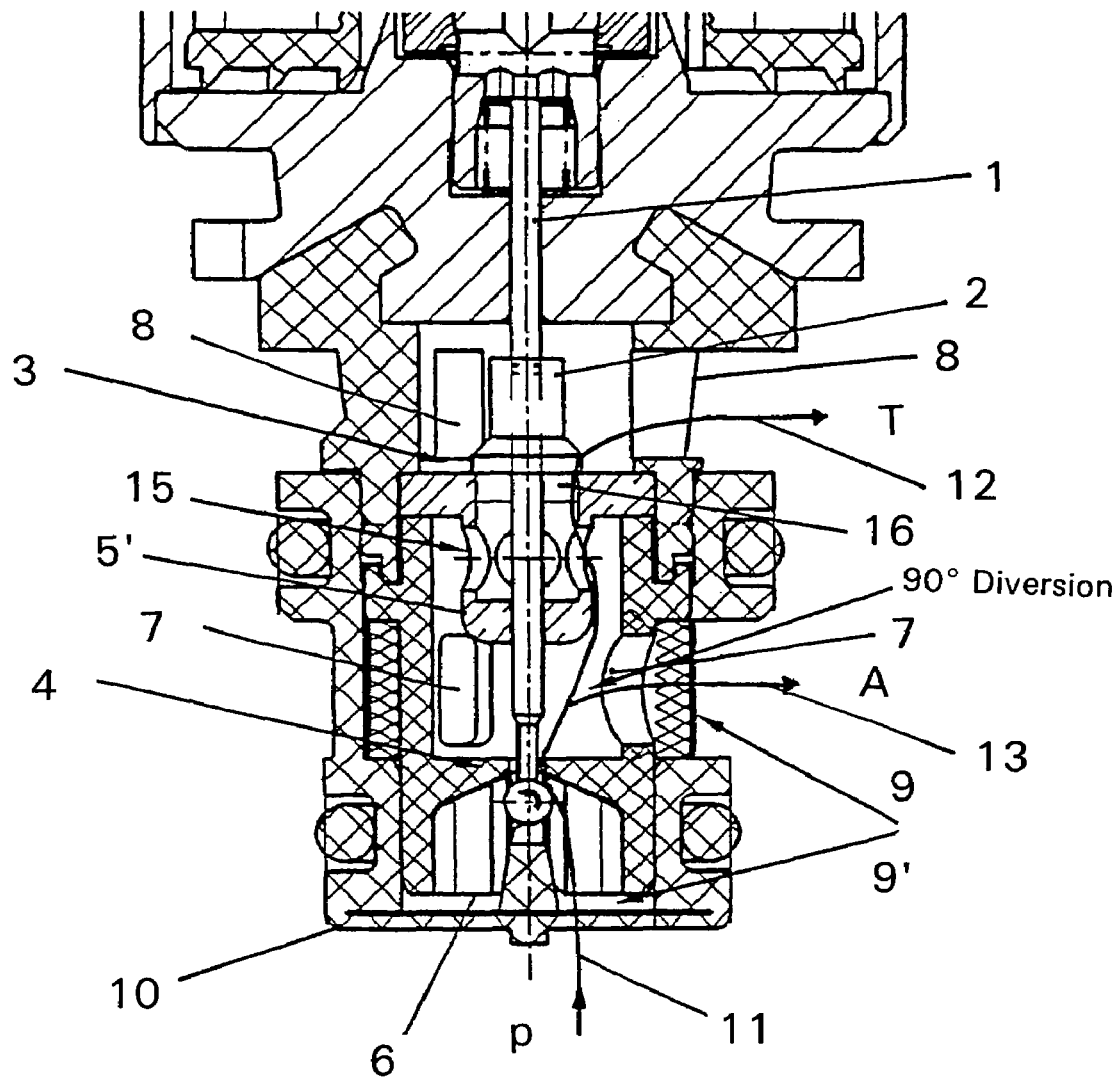
FIG. 2 is a cut through a valve part of a proportional, pressure control valve constructed according to the invention.

In the embodiment of the proportional, pressure control valve of the invention, shown in FIG. 2, in which identical parts are provided with the same reference numerals, the inflow opening 6 for the inflow volume stream with the inflow pressure p is located in a front end side 10 of the valve part facing from the magnet part and is constructed coaxially to its longitudinal axis. At least one outflow opening 7 for the filling volume stream in the direction of the clutch with the operating pressure A is constructed in the side wall of the valve part radially to its longitudinal axis.

Inserted below the flat seat 3 in a manner to optimize the flow is the thin-walled stream diverter 5' which is penetrated by the activation part 1 for the closing part 2 and which is provided with a large, cross bored hole 15. Here "thin"-walled means that the wall thickness of the stream diverter 5' is smaller than 0.15·NW, while "large" in this context means that the diameter of the cross bored hole is larger than 0.5·NW.

NW thereby means the nominal width, which is defined as the diameter of the opening 16 in the flat seat 3.

In another design intended to optimize the flow, the axial distance of the steam diverter 5' from the ball seat 4 is larger than 1.0·NW, whereby its diameter is preferably smaller than 1.3·NW.

FIG. 2 also shows flow streams consisting of fluid particles to illustrate the optimized flow course in the proportional pressure control valve constructed according to the invention, whereby a fluid particle entering the inflow opening 6 follows the path 11 and thereby flows in a straight line to the ball seat 4. Thereafter it will follow path 13 in the direction of one or several outflow openings 7 through which the filling volume stream is guided to the clutch, whereby it experiences a diversion of 90°, or it follows path 12 and thereby flows almost in a straight line through the stream diverter 5' and through the opening 16 in the flat seat 3, whereupon the fluid particles experience a 90° diversion in the direction of the outflow opening 8 for the tank volume stream.

In this construction only the following flow resistance remains:
the filter sieve 9',
the ball seat 5 (for path 11),
a 90° diversion,
the filter sieve 9 (for path 13),
a basically straight flow through stream diverter 5',
the flat seat 3,
the tank (for path 12).

In another design intended to minimize flow resistance, a mesh size of at least 190 μm is selected for both filter sieves 9', 9, which are inserted in the inflow opening 6 and the outflow opening 7, and a value of greater than 4·nominal surface for the total area of the outflow openings 7 for the filling volume stream in the direction of the clutch with the operating pressure A. Thereby the nominal area is defined as 1·nominal width$^2$·Π/4. Thus a significantly wider flow cross-section is available in the direction of the outflow openings 7 for the filling volume stream compared with the narrow flow cross-section 14 of FIG. 1.

It is clear from the paths 11 and 12, shown in FIG. 2 for the flow streams of fluid particles, that the diversion angle is no larger than 30° for the fluid particles which, after flowing through the ball seat 4, move to the stream diverter 5' and flow through it. After flowing through the stream diverter 5', the diversion angle of the fluid particles moving in the direction of one or several outflow openings 8 for the tank volume stream has a maximum value of 90°. Those fluid particles, which move in the direction of the outflow opening 7 after flowing through the ball seat 4, are likewise deflected by a maximum of 90°.

All these measures intended to optimize flow according to the invention increase the cut-off frequency of the pressure control valve in the system already mentioned above of clutch+starting element, for example, at a temperature of −20° C. by more than a factor of 3. That results in the desired improved ability to control the clutches as well as in shorter response times, as was confirmed during practical use.

REFERENCE NUMERALS

1 activation part
2 closing means
3 flat seat
4 ball seat
5,5' stream diverter
6 inflow opening
7 outflow opening
8 outflow opening
9,9' filter sieve
10 front side end
11 flow stream
12 flow stream
13 flow stream
14 flow cross-section
15 cross drilled hole
16 opening

The invention claimed is:

1. A proportional pressure-control valve with a magnetic part and a valve part, the valve part being provided with an inflow opening for an inflow volume stream, a first outflow opening for a filling volume stream, and a second outflow opening for a tank volume stream, and comprising a ball seat, a flat seat provided with an opening, a closing part for controlling a throughput quantity through the opening in the flat seat, and a stream diverter, which is positioned between the ball seat and the flat seat, the inflow opening (6) for the inflow volume stream being constructed on a front side end (10) of a valve part facing away from the magnetic part and coaxially with its longitudinal axis, at least one outflow opening (7) for the filling volume stream being constructed in a side wall of the valve part radially to its longitudinal axis, and an axial distance of the stream diverter (5') from the ball seat (4), as well as a diameter, a wall thickness, and a shape of the stream diverter (5') being selected such that fluid particles, after flowing through the ball seat (4) and to and through the stream diverter (5'), are exposed to a diversion of less than 30°; and the stream diverter (5') being provided with a cross drilled hole (15).

2. The proportional pressure control valve according to claim 1, wherein the axial distance of the stream diverter (5') from the ball seat (4) is greater than 1·NW, whereby NW is a diameter of the opening (16) in the flat seat (3).

3. The proportional pressure-control valve according to claim 1, wherein the diameter of the stream diverter (5') is smaller than 1.3·NW, whereby NW is a diameter of the opening (16) in the flat seat (3).

4. The proportional pressure-control valve according to claim 1, wherein the wall thickness of the stream diverter (5') is smaller than 0.15·NW, whereby NW is a diameter of the opening (16) in the flat seat (3).

5. The proportional pressure-control valve according to claim 1, wherein the diameter of the cross drilled hole is greater than 0.5·NW, whereby NW is a diameter of the opening (16) in the flat seat (3).

6. The proportional pressure-control valve according to claim 1, wherein a filter sieve (9', 9,), which has a mesh size is at least 190 μm, is inserted into the inflow opening (6) and into at least one outflow opening (7).

7. The proportional pressure-control valve according to claim 1, wherein a total area of the outflow openings (7) for the filling volume stream is greater than 4·a nominal area, whereby the nominal area is equal to $1 \cdot NW^2 \cdot \Pi/4$, and NW is a diameter of the opening (16) in the flat seat (3).

* * * * *